US009511690B2

(12) United States Patent
Preisler et al.

(10) Patent No.: US 9,511,690 B2
(45) Date of Patent: Dec. 6, 2016

(54) CARGO MANAGEMENT SYSTEM INCLUDING A VEHICLE LOAD FLOOR HAVING A CELLULOSE-BASED CORE AND MADE BY A COMPOSITE, COMPRESSION MOLDING PROCESS AND HAVING A WOOD GRAIN FINISH

(71) Applicant: GLOBAL IP HOLDINGS, LLC, Sterling Heights, MI (US)

(72) Inventors: Darius J. Preisler, Macomb, MI (US); Christopher A. Heikkila, Washington Township, MI (US); Steven A. Mitchell, Linden, MI (US); Jeffrey P. Schmelzer, Washington, MI (US)

(73) Assignee: GLOBAL IP HOLDINGS, LLC, Sterling Heights, MI (US)

( * ) Notice: Subject to any disclaimer, the term of this patent is extended or adjusted under 35 U.S.C. 154(b) by 113 days.

(21) Appl. No.: 14/603,397

(22) Filed: Jan. 23, 2015

(65) Prior Publication Data

US 2015/0130220 A1 May 14, 2015

Related U.S. Application Data

(63) Continuation-in-part of application No. 14/087,563, filed on Nov. 22, 2013, which is a continuation-in-part of application No. 13/523,209, filed on Jun. 14, 2012, now Pat. No. 8,622,456, which is a continuation-in-part of application No. 13/453,201, filed on Apr. 23, 2012, now Pat. No. 8,690,233.

(51) Int. Cl.
| | |
|---|---|
| *B62D 25/20* | (2006.01) |
| *B60N 2/36* | (2006.01) |
| *B60R 13/01* | (2006.01) |
| *B60N 2/60* | (2006.01) |
| *B32B 7/12* | (2006.01) |
| *B32B 21/08* | (2006.01) |
| *B32B 21/14* | (2006.01) |
| *B32B 27/06* | (2006.01) |
| *B32B 27/20* | (2006.01) |
| *B32B 27/32* | (2006.01) |
| *B32B 27/36* | (2006.01) |
| *B32B 1/00* | (2006.01) |

(52) U.S. Cl.
CPC . *B60N 2/36* (2013.01); *B32B 1/00* (2013.01); *B32B 7/12* (2013.01); *B32B 21/08* (2013.01); *B32B 21/14* (2013.01); *B32B 27/065* (2013.01); *B32B 27/20* (2013.01); *B32B 27/32* (2013.01); *B32B 27/36* (2013.01); *B60N 2/6009* (2013.01); *B60R 13/013* (2013.01); *B32B 2255/08* (2013.01); *B32B 2262/101* (2013.01); *B32B 2262/106* (2013.01); *B32B 2266/025* (2013.01); *B32B 2266/06* (2013.01); *B32B 2605/08* (2013.01); *B60N 2002/363* (2013.01)

(58) Field of Classification Search
CPC ............. B62D 25/20; B32B 1/00; B32B 7/12; B32B 21/08; B32B 2317/16
USPC ...................................................... 296/193.07
See application file for complete search history.

(56) References Cited

U.S. PATENT DOCUMENTS

| | | |
|---|---|---|
| 3,568,254 A | 3/1971 | Stolki |
| 3,651,563 A | 3/1972 | Volkmann |
| 3,750,525 A | 8/1973 | Waters et al. |
| 3,955,266 A | 5/1976 | Honami et al. |
| 4,175,995 A | 11/1979 | Walter |
| 4,204,822 A | 5/1980 | Hewitt |
| 4,550,854 A | 11/1985 | Schellenberg |
| 4,717,612 A | 1/1988 | Shackelford |
| 4,836,380 A | 6/1989 | Walter et al. |
| 4,941,785 A | 7/1990 | Witten |
| 5,026,445 A | 6/1991 | Mainolfi et al. |
| 5,074,726 A | 12/1991 | Betchel et al. |
| 5,143,778 A | 9/1992 | Shuert |
| 5,198,175 A | 3/1993 | Kato et al. |
| 5,217,563 A | 6/1993 | Niebling et al. |
| 5,253,962 A | 10/1993 | Close, Jr. |
| 5,298,694 A | 3/1994 | Thompson et al. |
| 5,316,604 A | 5/1994 | Fell |

(Continued)

FOREIGN PATENT DOCUMENTS

CA 2775260 A1 * 4/2011 ........... B29C 70/086

OTHER PUBLICATIONS

Non-Final Office Action, related U.S. Appl. No. 13/762,879; dated Feb. 13, 2015.
Non-Final Office Action, related U.S. Appl. No. 13/479,974; dated Feb. 13, 2015.
Notice of Allowance and Fee(s) Due; related U.S. Appl. No. 13/603,552; dated Feb. 18, 2015.
Corrected Notice of Allowability; related U.S. Appl. No. 14/603,401; dated Jun. 23, 2016.
Office Action; related U.S. Appl. No. 14/603,418; dated Jun. 16, 2016.

(Continued)

*Primary Examiner* — Pinel Romain
(74) *Attorney, Agent, or Firm* — Brooks Kushman P.C.

(57) ABSTRACT

A cargo management system including a vehicle load floor having a cellulose-based core to compartmentalize a cargo area of the vehicle into an upper compartment and a covered lower compartment is provided. The floor has a wood grain finish. The load floor includes a compression-molded composite panel that includes first and second outer layers of fiber-reinforced thermoplastic material, first and second sheets of thermoplastic adhesive and a core of cellulose-based material and positioned between the outer layers. The core has a large number of cavities. The outer layers are bonded to the core by the first and second sheets and by press molding. The first outer layer having a top surface on which a multi-layer sheet is bonded by the press molding. The multi-layer sheet has a substantially planar upper support surface to support cargo in the upper compartment and to provide the load floor with the wood grain finish.

10 Claims, 6 Drawing Sheets

(56) References Cited

U.S. PATENT DOCUMENTS

| | | |
|---|---|---|
| 5,370,521 A | 12/1994 | McDougall |
| 5,417,179 A | 5/1995 | Niemier et al. |
| 5,423,933 A | 6/1995 | Horian |
| 5,474,008 A | 12/1995 | Vespoli et al. |
| 5,502,930 A | 4/1996 | Burkette et al. |
| 5,534,097 A | 7/1996 | Fasano et al. |
| 5,683,782 A | 11/1997 | Duchene |
| 5,700,050 A | 12/1997 | Gonas |
| 5,744,210 A | 4/1998 | Hofmann et al. |
| 5,750,160 A | 5/1998 | Weber et al. |
| 5,911,360 A | 6/1999 | Schellenberg |
| 5,915,445 A | 6/1999 | Rauenbusch |
| 5,928,735 A | 7/1999 | Padmanabhan et al. |
| 5,979,962 A | 11/1999 | Balentin et al. |
| 6,050,630 A | 4/2000 | Hochet |
| 6,066,217 A | 5/2000 | Dibble et al. |
| 6,102,464 A | 8/2000 | Schneider et al. |
| 6,102,630 A | 8/2000 | Schneider et al. |
| 6,280,551 B1 | 8/2001 | Hilligoss |
| 6,435,577 B1 | 8/2002 | Renault |
| 6,537,413 B1 | 3/2003 | Hochet et al. |
| 6,546,694 B2 | 4/2003 | Clifford |
| 6,615,762 B1 | 9/2003 | Scott |
| 6,631,785 B2 | 10/2003 | Khambete et al. |
| 6,655,299 B2 | 12/2003 | Preisler et al. |
| 6,659,223 B2 | 12/2003 | Allison et al. |
| 6,682,675 B1 | 1/2004 | Vandangeot et al. |
| 6,682,676 B1 | 1/2004 | Renault et al. |
| 6,748,876 B2 | 6/2004 | Preisler et al. |
| 6,752,443 B1 | 6/2004 | Thompson et al. |
| 6,790,026 B2 | 9/2004 | Vandangeot et al. |
| 6,793,747 B2 | 9/2004 | North et al. |
| 6,823,803 B2 | 11/2004 | Preisler |
| 6,825,803 B2 | 11/2004 | Wixforth et al. |
| 6,843,525 B2 | 1/2005 | Preisler |
| 6,890,023 B2 | 5/2005 | Preisler et al. |
| 6,905,155 B1 | 6/2005 | Presley et al. |
| 6,926,348 B2 | 8/2005 | Krueger et al. |
| 6,945,594 B1 | 9/2005 | Bejin et al. |
| 6,981,863 B2 | 1/2006 | Renault et al. |
| 7,014,259 B2 | 3/2006 | Heholt |
| 7,059,646 B1 | 6/2006 | DeLong et al. |
| 7,059,815 B2 | 6/2006 | Ando et al. |
| 7,090,274 B1 | 8/2006 | Khan et al. |
| 7,093,879 B2 | 8/2006 | Putt et al. |
| 7,121,128 B2 | 10/2006 | Kato et al. |
| 7,121,601 B2 | 10/2006 | Mulvihill et al. |
| 7,188,881 B1 | 3/2007 | Sturt et al. |
| 7,204,056 B2 | 4/2007 | Sieverding |
| 7,207,616 B2 | 4/2007 | Sturt |
| 7,222,915 B2 | 5/2007 | Philippot et al. |
| 7,264,685 B2 | 9/2007 | Katz et al. |
| 7,320,739 B2 | 1/2008 | Thompson, Jr. et al. |
| 7,393,036 B2 * | 7/2008 | Bastian .................. B60R 5/04 296/26.09 |
| 7,402,537 B1 | 7/2008 | Lenda et al. |
| 7,419,713 B2 | 9/2008 | Wilkens et al. |
| 7,530,322 B2 | 5/2009 | Angelini |
| 7,628,440 B2 | 12/2009 | Berhardsson et al. |
| 7,713,011 B2 | 5/2010 | Orszagh et al. |
| 7,837,009 B2 | 11/2010 | Gross et al. |
| 7,854,211 B2 | 12/2010 | Rixford |
| 7,909,379 B2 | 3/2011 | Winget et al. |
| 7,918,313 B2 | 4/2011 | Gross et al. |
| 7,919,031 B2 | 4/2011 | Winget et al. |
| 7,942,475 B2 | 5/2011 | Murray |
| 7,963,243 B2 | 6/2011 | Quigley |
| 8,052,237 B2 | 11/2011 | Althammer et al. |
| 8,062,762 B2 | 11/2011 | Stalter |
| 8,069,809 B2 | 12/2011 | Wagenknecht et al. |
| 8,117,972 B2 | 2/2012 | Winget et al. |
| 8,133,419 B2 | 3/2012 | Burks et al. |
| 8,262,968 B2 | 9/2012 | Smith et al. |
| 8,298,675 B2 | 10/2012 | Allessandro et al. |
| 8,316,788 B2 | 11/2012 | Willis |
| 8,475,884 B2 | 7/2013 | Kia |
| 8,622,456 B2 | 1/2014 | Preisler et al. |
| 8,651,549 B2 | 2/2014 | Raffel et al. |
| 8,690,233 B2 | 4/2014 | Preisler et al. |
| 8,764,089 B2 | 7/2014 | Preisler et al. |
| 8,795,465 B2 | 8/2014 | Preisler et al. |
| 8,795,807 B2 | 8/2014 | Preisler et al. |
| 8,808,827 B2 | 8/2014 | Preisler et al. |
| 8,808,828 B2 | 8/2014 | Preisler et al. |
| 8,808,829 B2 | 8/2014 | Preisler et al. |
| 8,808,830 B2 | 8/2014 | Preisler et al. |
| 8,808,831 B2 | 8/2014 | Preisler et al. |
| 8,808,833 B2 | 8/2014 | Preisler et al. |
| 8,808,834 B2 | 8/2014 | Preisler et al. |
| 8,808,835 B2 | 8/2014 | Preisler et al. |
| 8,834,985 B2 | 9/2014 | Preisler et al. |
| 8,852,711 B2 | 10/2014 | Preisler et al. |
| 8,859,074 B2 | 10/2014 | Preisler et al. |
| 8,883,285 B2 | 11/2014 | Preisler et al. |
| 9,302,315 B2 | 4/2016 | Verbeek et al. |
| 9,364,975 B2 | 6/2016 | Preisler et al. |
| 2004/0078929 A1 | 4/2004 | Schoemann |
| 2005/0189674 A1 | 9/2005 | Hochet et al. |
| 2006/0008609 A1 | 1/2006 | Snyder et al. |
| 2006/0121244 A1 | 6/2006 | Godwin et al. |
| 2006/0166025 A1 * | 7/2006 | Huang .................. B27D 1/04 428/535 |
| 2006/0255611 A1 | 11/2006 | Smith et al. |
| 2007/0065264 A1 | 3/2007 | Sturt et al. |
| 2007/0069542 A1 | 3/2007 | Steiger et al. |
| 2007/0256379 A1 | 11/2007 | Edwards |
| 2007/0258786 A1 | 11/2007 | Orszagh et al. |
| 2008/0169678 A1 | 7/2008 | Ishida et al. |
| 2008/0185866 A1 | 7/2008 | Tarrant et al. |
| 2008/0193256 A1 | 8/2008 | Neri |
| 2009/0108639 A1 | 4/2009 | Sturt et al. |
| 2010/0026031 A1 | 2/2010 | Jouraku |
| 2010/0086728 A1 | 4/2010 | Theurl et al. |
| 2010/0170746 A1 * | 7/2010 | Restuccia ............. B29C 70/083 181/290 |
| 2010/0206467 A1 | 8/2010 | Durand et al. |
| 2011/0260359 A1 | 10/2011 | Durand et al. |
| 2011/0315310 A1 | 12/2011 | Trevisan et al. |
| 2012/0247654 A1 | 10/2012 | Piccin et al. |
| 2012/0315429 A1 | 12/2012 | Stamp et al. |
| 2013/0031752 A1 | 2/2013 | Davies |
| 2013/0075955 A1 | 3/2013 | Piccin et al. |
| 2013/0101822 A1 * | 4/2013 | Kunal .................. B32B 3/26 428/219 |
| 2013/0137798 A1 | 5/2013 | Piccin |
| 2013/0278002 A1 | 10/2013 | Preisler et al. |
| 2013/0278003 A1 | 10/2013 | Preisler et al. |
| 2013/0278007 A1 | 10/2013 | Preisler et al. |
| 2013/0278008 A1 | 10/2013 | Preisler et al. |
| 2013/0278009 A1 | 10/2013 | Preisler et al. |
| 2013/0278015 A1 | 10/2013 | Preisler et al. |
| 2013/0278018 A1 | 10/2013 | Preisler et al. |
| 2013/0278019 A1 | 10/2013 | Preisler et al. |
| 2013/0278020 A1 | 10/2013 | Preisler et al. |
| 2013/0280459 A1 | 10/2013 | Nakashima et al. |
| 2013/0280469 A1 | 10/2013 | Preisler et al. |
| 2013/0280472 A1 | 10/2013 | Preisler et al. |
| 2013/0312652 A1 | 11/2013 | Preisler et al. |
| 2013/0316123 A1 | 11/2013 | Preisler et al. |
| 2013/0333837 A1 | 12/2013 | Preisler et al. |
| 2013/0341971 A1 * | 12/2013 | Masini .................. B29C 70/86 296/210 |
| 2014/0030470 A1 * | 1/2014 | Gantner .................. B32B 3/04 428/76 |
| 2014/0077518 A1 | 3/2014 | Preisler et al. |
| 2014/0077530 A1 | 3/2014 | Preisler et al. |
| 2014/0077531 A1 | 3/2014 | Preisler et al. |
| 2014/0154461 A1 | 6/2014 | Preisler et al. |
| 2014/0225296 A1 | 8/2014 | Preisler et al. |
| 2014/0335303 A1 | 11/2014 | Preisler et al. |
| 2015/0130105 A1 | 5/2015 | Preisler et al. |
| 2015/0130220 A1 | 5/2015 | Preisler et al. |
| 2015/0130221 A1 | 5/2015 | Preisler et al. |

(56) References Cited

U.S. PATENT DOCUMENTS

| | | |
|---|---|---|
| 2015/0130222 A1 | 5/2015 | Preisler et al. |
| 2015/0132532 A1 | 5/2015 | Preisler et al. |
| 2016/0059446 A1 | 3/2016 | Lofgren |

OTHER PUBLICATIONS

Notice of Allowance and Fee(s) Due; related U.S. Appl. No. 14/444,164; dated Jul. 15, 2016.
Office Action; related U.S. Appl. No. 14/603,397; dated Jul. 21, 2016.
Office Action; related U.S. Appl. No. 14/603,430; notification date Sep. 14, 2016.
Office Action; related U.S. Appl. No. 14/603,404; notification date Aug. 25, 2016.
Office Action; Related U.S. Appl. No. 13/479,974; Date of mailing Oct. 15, 2014.
Office Action; related U.S. Appl. No. 13/479,974; date of mailing Mar. 20, 2014.
Office Action; related U.S. Appl. No. 13/686,362; date of mailing Mar. 25, 2014.
Office Action; related U.S. Appl. No. 13/523,253; date of mailing Mar. 25, 2014.
Office Action; related U.S. Appl. No. 13/688,972; date of mailing Mar. 28, 2014.
Office Action; related U.S. Appl. No. 13/687,232; date of mailing Mar. 28, 2014.
Office Action; related U.S. Appl. No. 13/689,809; date of mailing Mar. 31, 2014.
Office Action; related U.S. Appl. No. 13/687,213; date of mailing Mar. 31, 2014.
Office Action; related U.S. Appl. No. 13/690,265; date of mailing Mar. 31, 2014.
Office Action; related U.S. Appl. No. 13/762,904; date of mailing Apr. 8, 2014.
Office Action; related U.S. Appl. No. 13/762,800; date of mailing Apr. 8, 2014.
Office Action; related U.S. Appl. No. 13/762,861; date of mailing Apr. 9, 2014.
Office Action; related U.S. Appl. No. 13/690,566; date of mailing Apr. 9, 2014.
Office Action; related U.S. Appl. No. 13/762,832; date of mailing Apr. 11, 2014.
Office Action; related U.S. Appl. No. 13/762,921; date of mailing Apr. 14, 2014.
Notice of Allowance; related U.S. Appl. No. 13/686,388; date of mailing Apr. 15, 2014.
Related U.S. Appl. No. 13/690,566, filed Nov. 30, 2012.
Related U.S. Appl. No. 13/762,921, filed Feb. 8, 2013.
Related U.S. Appl. No. 13/762,956, filed Feb. 8, 2013.
Office Action; U.S. Appl. No. 13/762,956; notification date Apr. 17, 2015.
Office Action; U.S. Appl. No. 14/603,413; notification date Apr. 23, 2015.
Notice of Allowance and Fee(s) Due; related U.S. Appl. No. 14/087,591; date mailed Mar. 12, 2015.
Notice of Allowance and Fee(s) Due; related U.S. Appl. No. 14/603,403; date mailed Jan. 29, 2016.
Notice of Allowance and Fee(s) Due; related U.S. Appl. No. 14/087,563; date mailed Mar. 3, 2016.
Office Action; related U.S. Appl. No. 14/087,563; notification date Jul. 20, 2015.
Office Action; related U.S. Appl. No. 13/762,879; notification date Jul. 31, 2015.
Notice of Allowance and Fee(s) Due; related U.S. Appl. No. 14/087,579; date mailed Aug. 3, 2015.

\* cited by examiner

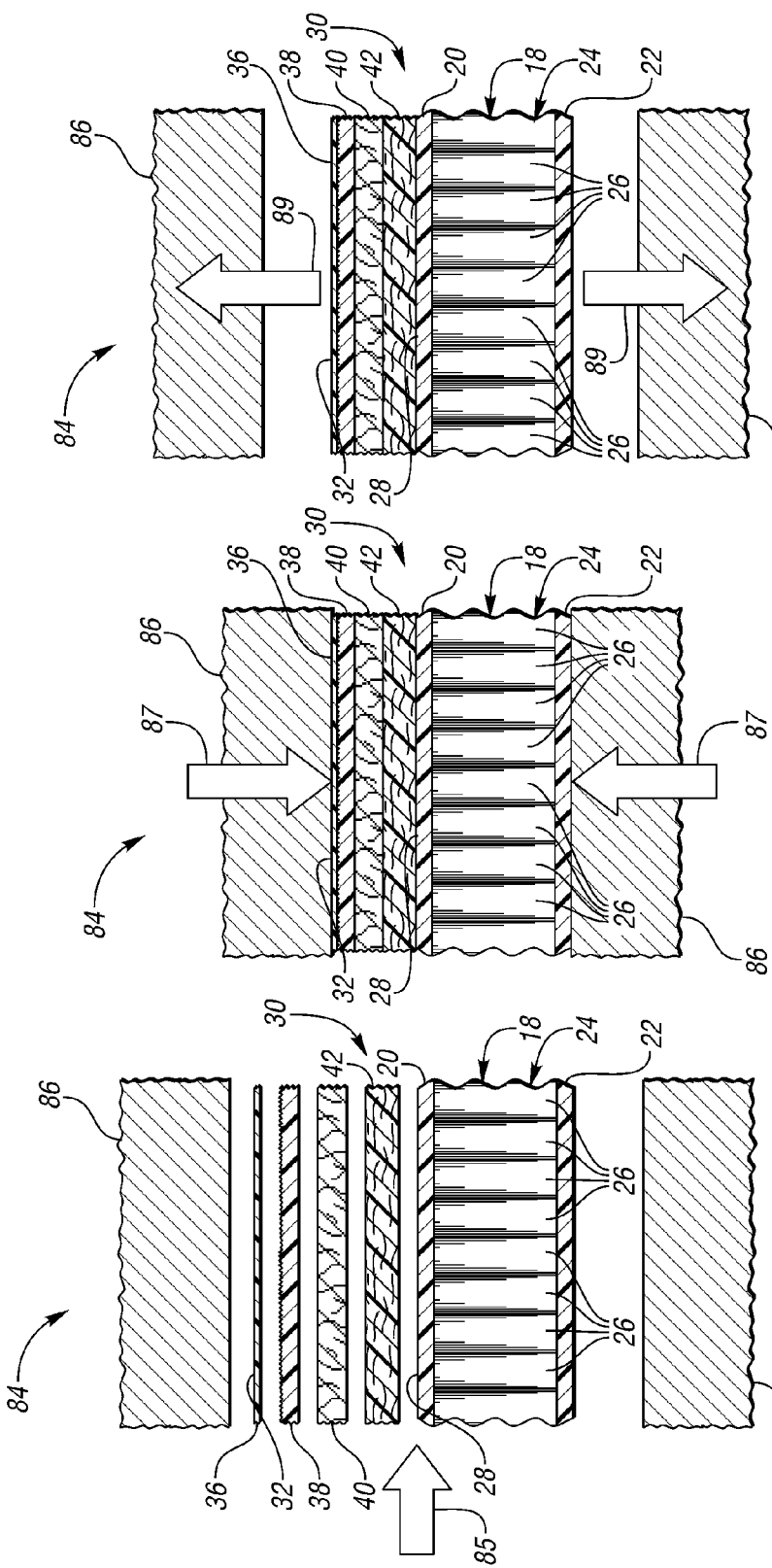

CARGO MANAGEMENT SYSTEM INCLUDING A VEHICLE LOAD FLOOR HAVING A CELLULOSE-BASED CORE AND MADE BY A COMPOSITE, COMPRESSION MOLDING PROCESS AND HAVING A WOOD GRAIN FINISH

CROSS-REFERENCE TO RELATED APPLICATIONS

This application is a continuation-in-part of U.S. application Ser. No. 14/087,563 filed Nov. 22, 2013. That application is a continuation-in-part of U.S. application Ser. No. 13/523,209 filed Jun. 14, 2012 (now U.S. Pat. No. 8,622,456), which, in turn, is a continuation-in-part of U.S. application Ser. No. 13/453,201 filed Apr. 23, 2012 (now U.S. Pat. No. 8,690,233). This application is also related to U.S. application entitled "Cargo Management System Including an Automotive Vehicle Seat Having a Cargo Trim Panel Made By a Composite, Compression Molding Process and Having a Wood Grain Finish" and "Cargo Management System For a Vehicle and Including a Pair of Opposing Cargo Trim Panels, Each of Which is Made By a Composite, Compression Molding Process and Has a Wood Grain Finish", both filed on the same date as this application.

TECHNICAL FIELD

This invention generally relates to cargo management systems for automotive vehicles and, in particular, to such systems having vehicle load floors with a cellulose-based core and which compartmentalize a cargo area of the vehicle into an upper compartment and a covered lower compartment.

Overview

Some plastic automotive parts are covered with wood trim after they are molded. Sometimes such plastic parts are composite plastic parts wherein an outer layer of the part is in-molded with a structural substrate of the part.

One practice in the automotive industry is utilization of all-plastic, fabricated parts, such as, but not limited to, instrument panels, interior trims, and door panels. It is known in other automotive parts areas that different, aesthetically pleasing outer surfaces enhance the overall appearance of the interior of automotive vehicles. Use of decorative appliques having wood grain finishes is often sought after.

Wood grain finishes are typically in the form of either simulated wood grain or genuine wood grain. The simulated wood grain finish may be achieved in one of several known manners: 1) backing a pre-printed film by a thin layer of a thermoplastic, such as polycarbonate; ABS (acrylonitrile/butadiene/styrene), or aluminum, followed by vacuum-forming to obtain the desired shape of the trim; 2) applying a lithograph on an aluminum sheet; and 3) dipping a substrate into a container of ink defining the wood grain appearance. Simulated wood grain finishes, however, are generally not as attractive as genuine wood grain finishes.

Genuine wood grain finishes may also be obtained in one of several known manners: 1) staining, sealing and protecting preformed laminates of wood having varying thicknesses which are then attached to a substrate via stapling, gluing, or any other similar attachment manner; 2) laminating an aluminum sheet with the genuine wood which is then welded or screwed onto a plastic part; and 3) adhesively bonding a thin laminate of wood to a pre-processed plastic substrate which is then stained and covered with a protective top-coat. Although the appearance of genuine wood is more attractive than simulated wood, the use of genuine wood is more expensive than that of simulated wood.

U.S. Pat. No. 5,423,933 discloses a method of producing a plastic-wood composite having the appearance of coated genuine wood. U.S. Pat. No. 5,744,210 discloses a natural wood-covered plastic part for an automotive vehicle and a method of making the part. U.S. Pat. No. 5,750,160 discloses a method of making plastic products such as door panels using nickel shell door molds having an authentic, textured mold surface reproduction of original wood.

The following U.S. patent documents relate to cargo management systems and trim panels for automotive vehicles: U.S. Pat. Nos. 6,752,443; 6,800,325; 6,843,525; 6,905,155; 6,926,348; 6,945,594; 7,059,646; 7,090,274; 7,121,601; 7,188,881; 7,207,616; 7,222,915; 7,419,713; 7,628,440; 7,909,379; 8,298,675; 8,475,884; 2004/0078929; 2006/0008609; 2006/0255611; 2007/0065264; 2007/0256379; 2008/0185866; 2009/0108639; 2010/0206467; 2011/0260359; 2011/0315310; 2012/0315429; 2012/0247654; 2013/0031752; 2013/0075955; and 2013/0137798.

The following recent U.S. published applications are also related to the present application: 2013/0278002; 2013/0278003; 2013/0278007; 2013/0278008; 2013/0278009; 2013/0278015; 2013/0278018; 2013/0278019; 2013/0278020; 2013/0280459; 2013/0280472; and 2013/0280473.

Compression molding is a method of molding in which the molding material, generally preheated, is first placed in an open, heated mold cavity. The mold is closed with a top force or plug member, pressure is applied to force the material into contact with all mold areas, while heat and pressure are maintained until the molding material has cured. The process may employ thermosetting resins in a partially cured stage, either in the form of granules, putty-like masses, or preforms. Compression molding is a high-volume, high-pressure method suitable for molding complex, high-strength fiberglass reinforcements. Advanced composite thermoplastics can also be compression molded with unidirectional tapes, woven fabrics, randomly oriented fiber mat or chopped strand. The advantage of compression molding is its ability to mold large, fairly intricate parts. Also, it is one of the lowest cost molding methods compared with other methods such as transfer molding and injection molding; moreover it wastes relatively little material, giving it an advantage when working with expensive compounds.

SUMMARY OF EXAMPLE EMBODIMENTS

An object of at least one embodiment of the present invention is to provide a cargo management system including a vehicle load floor having a cellulose-based core and made by a composite, compression molding process and having a wood grain finish.

In carrying out the above object and other objects of at least one embodiment of the present invention, a cargo management system including a vehicle load floor to compartmentalize a cargo area of the vehicle into an upper compartment and a covered lower compartment is provided. The floor has a wood grain finish. The system includes a compression-molded composite panel including first and second outer layers of fiber-reinforced thermoplastic material, first and second sheets of thermoplastic adhesive and a core of cellulose-based material and positioned between the outer layers and having a large number of cavities. The outer layers are bonded to the core by the first and second sheets and by press molding. The first outer layer has a top surface. A multi-layer sheet is bonded to the top surface of the first outer layer by the press molding and has a substantially planar upper support surface to support cargo in the upper compartment and to provide the load floor with the wood grain finish.

The load floor may include a cover part to cover the lower compartment, the cover part being movable between different use positions including open and closed positions relative to the rest of the load floor.

The cover part may be pivotally connected to the rest of the load floor.

The multi-layer sheet may include a pattern layer which provides the wood grain finish.

The multi-layer sheet may include a substrate layer bonded to the lower surface of the pattern layer.

The multi-layer sheet may include a backing layer bonded to a lower surface of the substrate layer, the backing layer being bonded to the top surface of the first outer layer by the press molding.

A plurality of parallel, spaced runners or rails may extend above a top surface of the multi-layer sheet to protect the top surface of the multi-layer sheet.

The pattern layer may be a vinyl layer formed to simulate wood. The pattern layer may have a wood design on an upper surface thereof. The pattern layer may comprise a layer of natural wood.

Further in carrying out the above object and other objects of at least one embodiment of the present invention, a cargo management system including a vehicle load floor to compartmentalize a cargo area of the vehicle into an upper compartment and a covered lower compartment is provided. The floor has a wood grain finish. The system includes a compression-molded composite panel including first and second outer layers of fiber-reinforced thermoplastic material, first and second sheets of thermoplastic adhesive and a core of cellulose-based material and positioned between the outer layers and having a large number of cavities. The outer layers are bonded to the core by the first and second sheets and by press molding. The first outer layer has a top surface. A multi-layer sheet is bonded to the top surface of the first outer layer by the press molding and has a substantially planar upper support surface to support cargo in the upper compartment and to provide the load floor with the wood grain finish. A cargo trim panel of the system is secured to a backrest of a seat of the vehicle. The trim panel also has a wood grain finish.

The load floor may include a cover part to cover the lower compartment. The cover part may be movable between different use positions including open and closed positions relative to the rest of the load floor.

The multi-layer cover part may be pivotally connected to the rest of the load floor.

The multi-layer sheet may include a pattern layer which provides the simulated wood grain finish.

The multi-layer sheet may include a substrate layer bonded to the lower surface of the pattern layer.

The multi-layer sheet may include a backing layer bonded to a lower surface of the substrate layer. The backing layer may be bonded to the top surface of the first outer layer by the press molding.

A plurality of parallel, spaced runners or rails may extend above a top surface of the multi-layer sheet to protect the top surface of the multi-layer sheet.

The pattern layer may be a vinyl layer formed to simulate wood. The pattern layer may have a wood design on an upper surface thereof.

Still further in carrying out the above object and other objects of at least one embodiment of the present invention, a cargo management system including a vehicle load floor to compartmentalize a cargo area of the vehicle into an upper compartment and a covered lower compartment is provided. The floor has a wood grain finish. The system includes a compression-molded composite panel including first and second outer layers of fiber-reinforced thermoplastic material, and first and second sheets of thermoplastic adhesive. A core of cellulose-based material is positioned between the outer layers and has a large number of cavities. The outer layers are bonded to the core by the first and second sheets and by press molding. The first outer layer has a top surface. A multi-layer sheet is bonded to the top surface of the first outer layer by the press molding and has a substantially planar upper support surface to support cargo in the upper compartment and to provide the load floor with the wood grain finish. A pair of cargo trim panels are supported above the vehicle load floor at opposite sides of the load floor within the interior of the vehicle. Each panel also has a wood grain finish.

Other technical advantages will be readily apparent to one skilled in the art from the following figures, descriptions and claims. Moreover, while specific advantages have been enumerated, various embodiments may include all, some or none of the enumerated advantages.

BRIEF DESCRIPTION OF THE DRAWINGS

FIGS. 7-9 are views, partially broken away and in cross section, showing different steps in compression molding a stack of different layers of materials to form the article or end product of at least one embodiment of the present invention;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
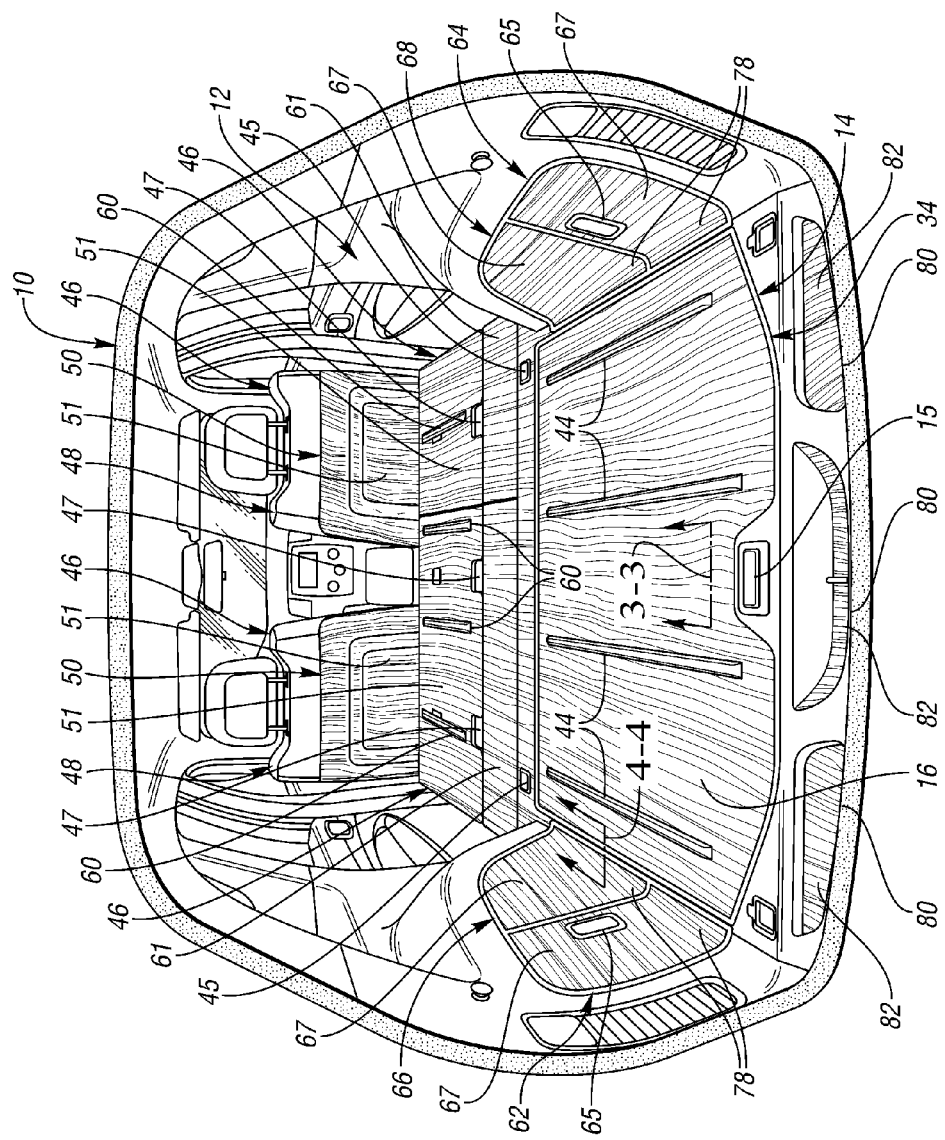
FIG. 1 is a rear perspective view of a cargo management system including a load floor having a wood grain finish and positioned in the cargo area of an automotive vehicle and constructed in accordance with at least one embodiment of the present invention.

Referring now to FIG. 1, there is illustrated a cargo management system, generally indicated at 12, located in the interior of a vehicle, generally indicated at 10, to manage cargo placed therein. Such management includes organizing, securing and restraining the cargo. The system 12 includes a vehicle load floor, generally indicated at 14, to compartmentalize a cargo area at the rear of the vehicle 10, into an upper compartment and a covered lowered compartment in which there are typically stored spare tires and/or tools. The load floor 14 has a wood grain finish 16 which is aesthetically pleasing.

A part of the load floor 14 includes a hinged cover, generally indicated at 34, which has a handle 15 to allow a user to hingedly move the cover 34 between open and closed positions as described in many of the above-mentioned, recently published U.S. patent applications. For example, a living hinge may be provided between the cover 34 and the rest of the load floor 14 to allow a user to open the cover 34 and access the lower compartment of the cargo area.

Figure 3:
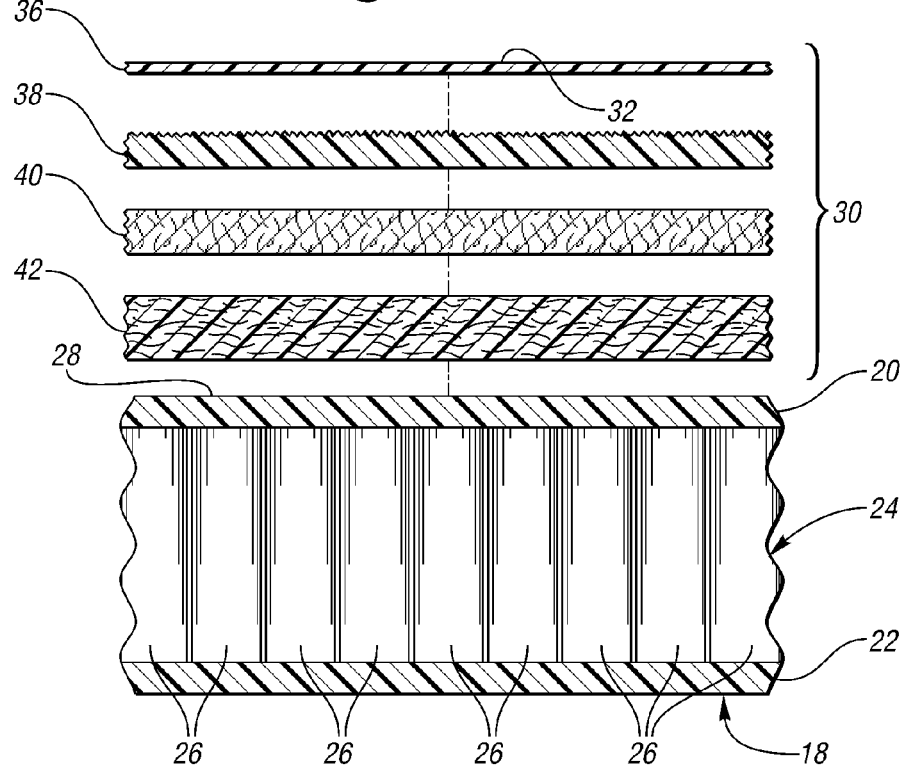
FIG. 3 is a view, partially broken away and in cross section, taken along lines 3-3 of FIG. 1 of a compression-molded composite panel and a sheet having multiple layers separated for illustrative purposes.

Referring now to FIG. 3, the load floor 14 includes a compression-molded, composite panel, generally indicated at 18. The panel 18 includes first and second outer skins or layers, 20 and 22 respectively, and a core 24 positioned between the outer layers 20 and 22. The core 24 has a large number of cavities 26. The outer layers 20 and 22 are bonded to the core 24 by press or compression molding.

Each of the skins 20 and 22 may be fiber reinforced. The thermoplastic of the skins 20 and 22 and the core 24 may be polypropylene. At least one of the skins 20 and 22 may be woven skin, such as a polypropylene skin. Each of the skins 20 and 22 may be reinforced with fibers, e.g., glass fibers, carbon fibers or natural fibers. At least one of the skins 20 and 22 may advantageously be made up of woven glass fiber fabric and of a thermoplastics material.

The cellular core 24 may be a honeycomb core. In this example, the cellular core 24 has an open-celled structure of the type made up of tubes or a honeycomb, and it is made mainly of polyolefin and preferably of polypropylene. It is also possible to use a cellular structure having closed cells of the foam type.

The hinged cover 34, as well as the rest of the load floor 14, is typically manufactured by providing a stack of material located or positioned within a mold such as the mold, generally indicated at 84 in FIGS. 7-9. The stack typically includes the first and second reinforced thermoplastic skins or outer layers 20 and 22, respectively, and the thermoplastic cellular core 24 disposed between and bonded to the skins 20 and 22 by press molding. The skins 20 and 22 are heated typically outside of the mold 84 to a softening temperature. The mold 84 is preferably a low-pressure, compression mold 84 having upper and lower mold halves 86 which perform a thermo-compression process on the stack of materials together with a multi-layer coverstock sheet, generally indicated at 30. In the molding process, the sheet 30 is bonded to the top surface 28 of the outer layer 20. The sheet 30 has a substantially planar upper support surface 32 to support cargo in the upper compartment of the cargo area. A pattern layer 38 of the sheet 30 provides the load floor 14 with the wood grain finish 16 shown in FIG. 1.

As shown in FIGS. 3 and 7-9, the multi-layer sheet 30 typically includes a wear layer 36 having the upper surface 32, the pattern layer 38, a substrate layer 40 and a binder layer 42 to bind or bond the sheet 30 to the top surface 28 of the panel 18 in a press or compression molding operation performed in the mold 84.

The multi-layer sheet 30 may be similar to an engineered wood floor. An engineered wood floor oftentimes includes two or more layers of wood. The pattern layer 38 typically is the wood that is visible to provide the wood grain finish. A veneer sheet uses a thin layer of wood.

Alternatively, instead of an engineered wood sheet, a laminate or vinyl (i.e. vinyl chloride) sheet may be used. A laminate sheet uses an image of wood at the surface of the pattern layer 38. A vinyl sheet is plastic formed as look like wood. A laminate sheet is a multi-layer synthetic sheet formed together in a lamination process. A laminate sheet simulates wood with an applique layer as the pattern layer 38 under a clear protective layer such as the wear layer 36. An inner core layer serves as the substrate layer 40. The inner core layer may be composed of melamine resin and fiber board materials.

An advantage of an engineered wood, laminate or vinyl sheet utilized as the coverstock sheet 30 is that periodic maintenance is minimized. An all-wood coverstock sheet finished in varnish requires periodic recoating. Also, bolts and screws require periodic tightening as wood expands and contracts through the seasons of the year.

Also, other advantages of engineered wood laminate or vinyl sheets is lower cost and a more durable surface provided by the wear layer 36. Also, engineered wood laminate or vinyl sheets accommodate design variations not always possible with solid wood sheets. Finally, engineered wood, vinyl and laminate sheets can be formed with a compression-molded composite panel, such as the panel 18, in a single compression or press molding operation as shown in FIGS. 7-9.

Referring again to FIG. 1, the system 12 may include a plurality of spaced, parallel runners or rails 44 fixedly secured to and extending above the top surface 32 of the sheet 30 to protect the wear layer 36. The rails 44 may be made of chrome inlaid with synthetic rubber to hinder undesired movement of cargo in the upper cargo compartment.

The load floor 14 may also have hooks 45 or tie-down loops fixedly secured to and extending above the top surface of the load floor 14.

Referring again to FIGS. 7-9, in one example method of making the load floor 14, a stack of material may be pressed in the low pressure, cold-forming mold 84 after the stack or layers of material are placed in the mold as indicated by an arrow 85. The stack is made up of the first skin 20, the cellular core 24, the second skin 22 and the covering or sheet 30, and is pressed at a pressure lying in the range of $10 \times 10^5$ Pa. to $30 \times 10^5$ Pa. as indicated by arrows 87. The first and second skins 20 and 24 (as well as some of the other layers such as the binder layer 42) are preferably pre-heated to make them malleable and stretchable. Advantageously, in order to soften the first and second skins 20 and 24, respectively, heat is applied to a pre-assembly constituted by the stack made up of at least the first skin 20, the cellular core 24, and the second skin 22 so that, while the panel 18 is being formed in the mold 84, the first and second skins 20 and 24 have a forming temperature lying approximately in the range of 160° C. to 200° C., and, in this example, about 180° C. Finally, after curing and cooling, the mold halves 86 are separated as indicated by arrows 89 to remove the part.

Figure 2:
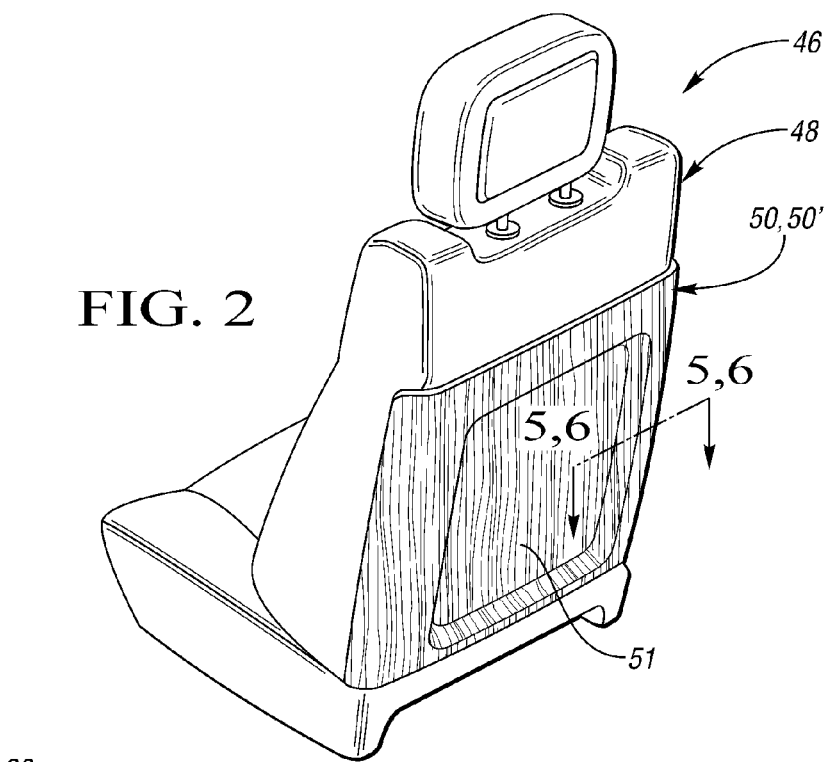
FIG. 2 is a rear perspective view of an automotive vehicle seat including a backrest with a cargo trim panel that has a wood grain finish.

Referring again to FIG. 1 and to FIG. 2, the cargo management system 12 may include one or more automotive vehicle seats, generally indicated at 46, each having a backrest 48 which separates the vehicle interior into a passenger area at the front of the vehicle 10 and a cargo area at the rear of the vehicle 10. The system 12 includes a driver's seat and a plurality of passenger seats. At least one of the passenger seats 46 is manually reconfigurable via handles 47 between an upright seating position as shown in FIG. 2 to fold-down, storage position as shown in FIG. 1 to reconfigure the vehicle interior. A cargo trim panel, generally indicated at 50 and 50' in FIG. 2, of two passenger seats 46 forms at least a part of the load floor 14 in the storage positions of the passenger seats 46 as shown in FIG. 1.

Figure 5:
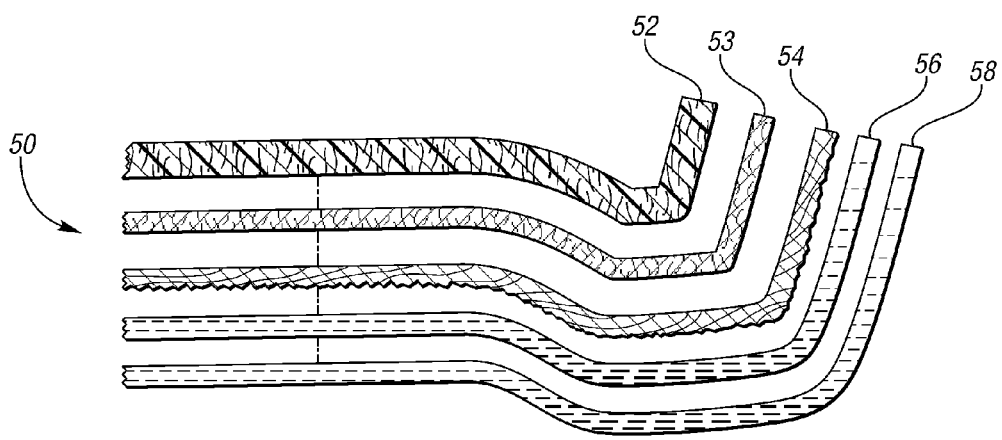
FIG. 5 is a view, partially broken way and in cross section, taken along lines 5-5 of FIG. 2 with the multiple layers of the trim panel separated.
Figure 6:
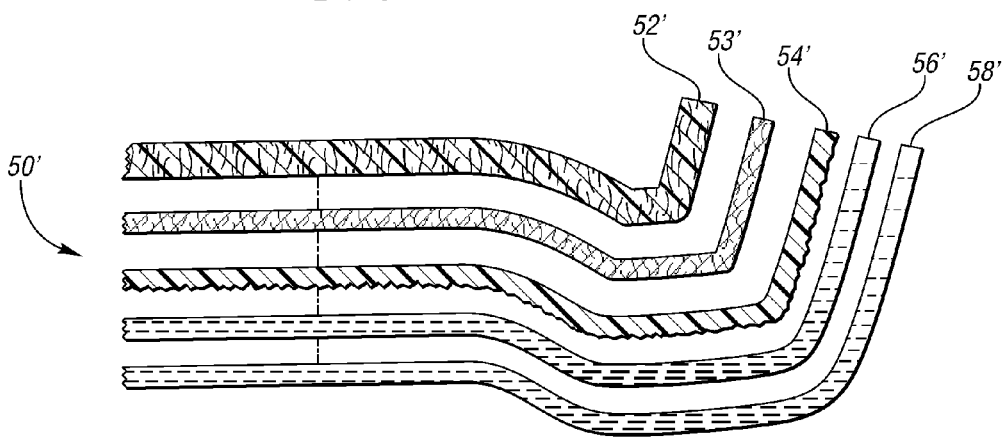
FIG. 6 is a view, similar to the view of FIG. 5, taken along lines 6-6 of FIG. 2 with the multiple layers of a trim panel of a second embodiment separated.

Each cargo trim panel 50 or 50' comprises a compression-molded, composite cargo trim panel secured to the backrest 48 and facing the upper compartment of the cargo area above the load floor 14 in an upright sitting position of the backrest 48. As shown in FIGS. 5 and 6, the panel 50 or 50' including a base layer 52 or 52' and a coverstock sheet comprising layers 53 or 53' and 54 or 54' bonded to the base layer 52 or 52' by press or compression molding. The coverstock sheet provides the trim panel 50 or 50' with a wood grain finish 51 in the upper compartment of the cargo area as shown in FIGS. 1 and 2.

The layer 54' may be a synthetic resin layer molded to have the wood grain finish 51 after the application of a varnish/stain coating or layer 56' and a clear coat or wear layer 58'. The layer 54 may be a natural wood layer with a varnish/stain layer 56 and a clear coat or wear layer 58 to provide the wood grain finish 51. The layers 53 and 53' may be porous, fibrous layers including an adhesive and possibly a catalyst to bond the layers 52 and 54 together and the layers 52' and 55' together, respectively. The base layers 52 and 52' may be made of a fiber-reinforced polymeric material such as sheet molding component (SMC). SMC is a ready-to-mold, glass-fibre reinforced polyester material often used in compression molding.

The cargo trim panel 50 or 50' may be molded in a mold similar to the mold 84 of FIGS. 7-9 which has upper and lower mold halves 86. The inner surface of the lower mold half may be textured to provide the layer 54 or layer 54' with a textured wood grain finish. Typically, after molding the coating layers 56 and 56' are applied to the layers 54 and 54', respectively, and then coating layers 58 and 58', are applied to the layers 56 and 56', respectively.

As described above, in this way the coverstock sheet may have either simulated wood grain finish or a natural or genuine wood grain finish.

As shown in FIG. 1, two of the seats 46 (typically in the last row of seats) include runners or rails 60 to protect the surface finishes 51 of the panels of the seats 46 when the backrests 48 are folded down is their storage positions to reconfigure the interior of the vehicle 10. In the fold-down positions of FIG. 1, the trim panels 50 or 50' form a part of the load floor 14. Also, hingedly connected, close-out flaps 61 between the seats 46 and the cover 34 of the load floor 14 form parts of the load floor 14.

Figure 4:
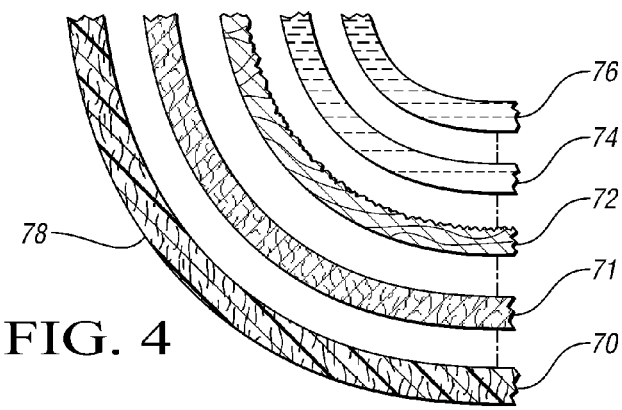
FIG. 4 is a view, partially broken away and in cross section, taken along lines 4-4 of FIG. 1 of a cargo trim panel with its multiple layers separated for illustrative purposes.

Still referring to FIG. 1, the system 10 includes a first pair of compression-molded, composite side cargo trim panels 62 and 64 and, preferably, a second pair of compression-molded, composite cargo trim panels 66 and 68 supported above the vehicle load floor 14 at opposite sides of the load floor 14 within the interior of the vehicle 10 to at least partially define the upper compartment of the cargo area. As shown in FIG. 4, each panel 62, 64, 66 or 68 includes a base layer 70 and a coverstock sheet including layers 72 and 71 bonded to the base layer 70 by press molding similar to the press molding shown in FIGS. 7-9. Each coverstock sheet provides its respective trim panel 62, 64, 66 or 68 with a wood grain finish 67 in the upper compartment of the cargo area.

In the example of FIG. 4, the layer 70 may be a fiber-reinforced, polymer layer, the layer 71 may be a porous, fibrous layer and the layer 72 may be a natural wood layer. However, it is to be understood that the layers 70-72 may be the same or similar to the layers of the panel 50 or the panel 50'. After the press or compression molding, a varnish or stain coating 74 is placed on the layer 72 and a clear wear coat layer 76 is applied over the layer 74 after the coating 74 has dried. A curved portion 78 of the panels 62, 64, 66 and 68 can be formed in the compression mold.

The system 12 may also include panels 80 also having wood grain finishes 82 at the rear of vehicle 10 to further contribute to the overall look and feel of the system 12.

Figure 10:
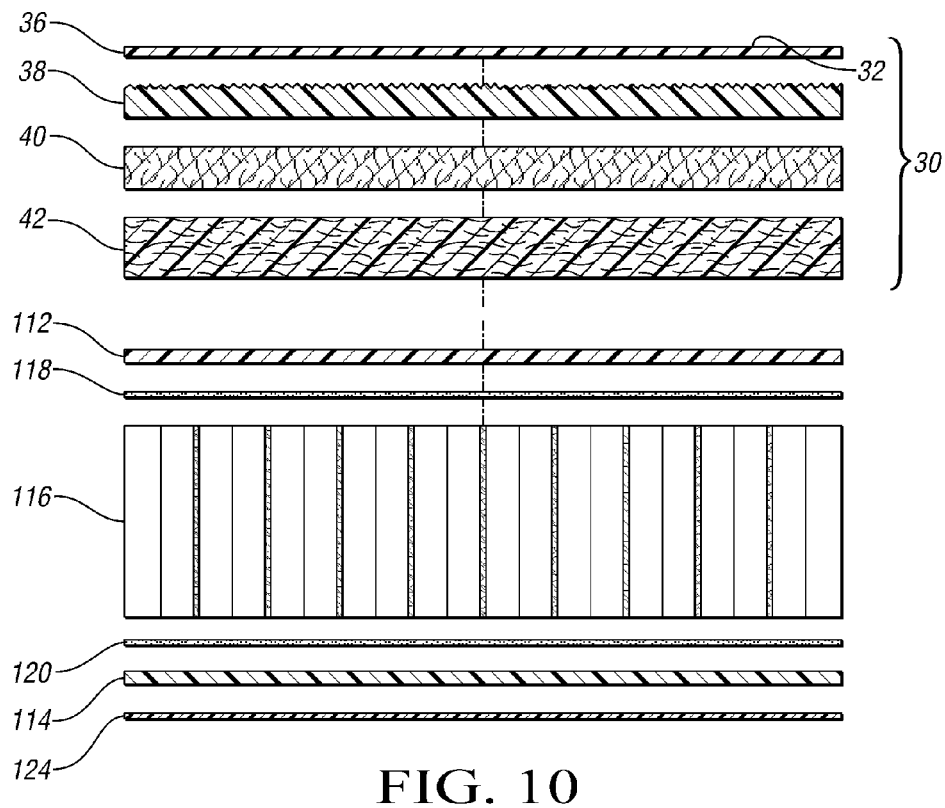
FIG. 10 is a side sectional view showing a stack of separate sheets or layers of thermoplastic-based and cellulose-based material prior to being compression molded into a composite panel having a sandwich structure.
Figure 11:
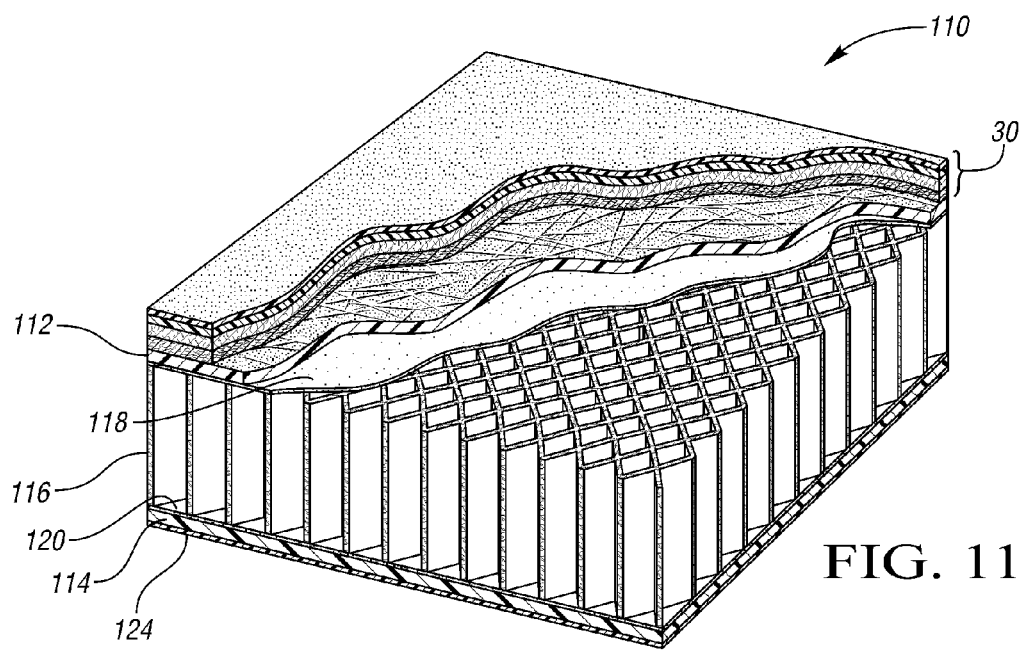
FIG. 11 is a top perspective view, partially broken away and a cross section, of the composite panel of FIG. 10.
Figure 12:
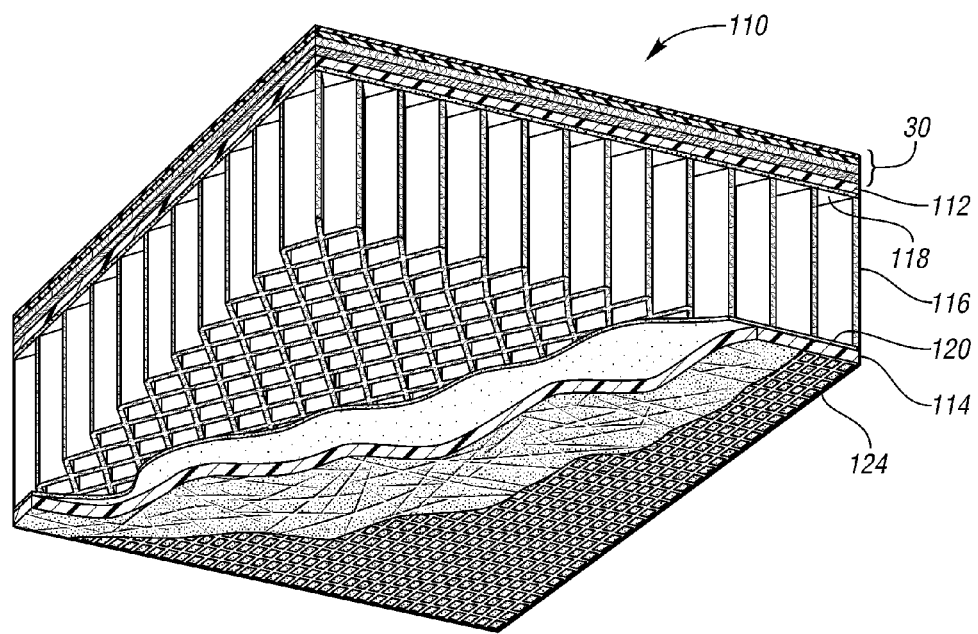
FIG. 12 is a view similar to the view of FIG. 11 but providing a bottom perspective view.
Figure 13:
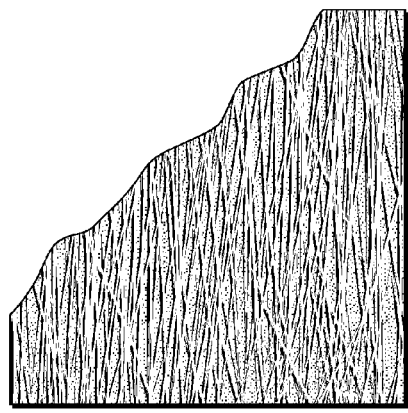
FIG. 13 is a top plan view, partially broken away, of a reinforced thermoplastic skin having substantially parallel, visible fibers.
Figure 14:
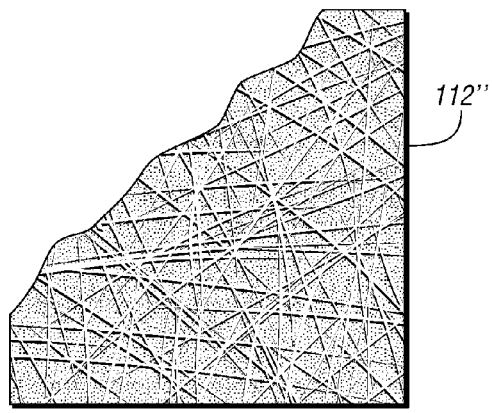
FIG. 14 is a view similar to the view of FIG. 13 but with substantially randomly oriented fibers.

Referring now to the FIGS. 11 and 12, a second embodiment of a compression-molded, sandwich-type composite panel, generally indicated at 110, is shown. FIG. 10 shows a stack of thermoplastic-based and cellulose-based sheets or layers of material prior to the stack being compression molded into the composite panel or component 110. The panel 110 forms a separate part of the vehicle. However, it is to be understood that one or more of such panels constructed in accordance with at least one embodiment of the present invention may be used in a wide variety of environments besides the automotive vehicle environment of FIG. 1. For example, the panel 110 may be a load-bearing vehicle component as shown or an interior trim component.

The panel 110 is typically manufactured via a thermo-compression process by providing the stack of material located or positioned within a low pressure, thermo-compression mold such as shown in FIGS. 7-9 at reference number 84. As shown in FIG. 10, the stack includes first and second reinforced thermoplastic skins or outer layers 112 and 114, respectively, a cellulose-based core having a large number of cavities such as a paper or cardboard cellular core 116 disposed between and bonded to plys or films or sheets of hot-melt adhesive (i.e. thermoplastic adhesive) 118 and 120 which, in turn, are disposed between and bonded to the skins 112 and 114 by the press or compression molding. The sheets 118 and 120 may be bonded to their respective skins 112 and 114 prior to the press molding or are preferably bonded during the press molding. The thermoplastic of the sheets 118 and 120 is typically compatible with the thermoplastic of the skins 112 and 114 so that a strong bond is formed therebetween. One or more other resins may also be included within the adhesive of the sheets 118 and 120 to optimize the resulting adhesive system. The adhesive system is not a solvent-based adhesive system.

A substantially continuous covering or multi-layer sheet, generally indicated at 30 and substantially the same as the sheet 30 of the embodiment of FIGS. 3 and 7-9, covers the first skin 112. The skins 112 and 114 and their respective sheets or film layers 118 and 120 (with the core 116 in between the layers 118 and 120) are heated typically outside of the mold 84 (i.e. in an oven) to a softening temperature wherein the hot-melt adhesive becomes sticky or tacky. The mold 84 is preferably a low-pressure, compression mold which performs a thermo-compression process on the stack of materials.

The step of applying the pressure compacts and reduces the thickness of the cellular core 116 and top and bottom surface portions of the cellular core 116 penetrate and extend into the film layers 118 and 120 without penetrating into and possibly encountering any fibers located at the outer surfaces of the skins 112 and 114 thereby weakening the resulting bond. Often times the fibers in the skins 112 and 114 are located on or at the surfaces of the skins as shown by skins 112' and 112" in FIGS. 9 and 10, respectively, wherein the fibers are substantially parallel and randomly oriented, respectively.

An optional bottom layer of the panel 110 comprises a decorative, noise-management, covering layer 124 bonded to the bottom surface of the panel 110 to provide sound insulation and an aesthetically pleasing appearance to the bottom of the panel 110 if and when the bottom of the panel 110 is exposed to a passenger of the vehicle or others. In other words, the covering layer 124 reduces the level of undesirable noise in a passenger compartment of the vehicle.

The cellulose-based, cellular core 116 may be a honeycomb core. In this example, the cellular core has an open-celled structure of the type made up of a tubular honeycomb, and it is made mainly of cellulose and preferably of paper or cardboard. The sticky or tacky hot-melt adhesive extends a small amount into the open cells during the thermo-compression process. It is also possible to use a cellular structure having closed cells, a material, such as a wooden part, to which the top and bottom film layers 118 and 120, respectively, are bonded.

Each of the skins 112 and 114 may be fiber reinforced. The thermoplastic of the sheets or film layers 118 and 120, the skins 112 and 114, and the covering layer 124 may be polypropylene. Alternatively, the thermoplastic may be polycarbonate, polyimide, acrylonitrile-butadiene-styrene as well as polyethylene, polyethylene terphthalate, polybutylene terphthalate, thermoplastic polyurethanes, polyacetal, polyphenyl sulphide, cyclo-olefin copolymers, thermotropic polyesters and blends thereof. At least one of the skins 112 or 114 may be woven skin, such as polypropylene skin. Each of the skins 112 and 114 may be reinforced with fibers, e.g., glass fibers, carbon fibers, aramid and/or natural fibers. At least one of the skins 112 and 114 can advantageously be made up of woven glass fiber fabric and of a thermoplastics material.

The resulting panel 110 may have a thickness in the range of 5 to 25 mm.

In one example method of making the panel 110, a stack of material may be pressed in the low pressure, cold-forming mold 84. The stack is made up of the first skin 112, the first film layer 118, the paper cellular core 116, the second film layer 120, the second skin 114, the multi-layer sheet 30, and the covering layer 124, and is pressed at a pressure lying in the range of $10 \times 10^5$ Pa. to $30 \times 10^5$ Pa. The first and second skins 112 and 114, and the first and second film layers 118 and 120 are preferably pre-heated to make them malleable and stretchable. Advantageously, in order to soften the first and second skins 112 and 114, and their respective film layers 118 and 120, respectively, heat is applied to a pre-assembly made up of at least the first skin 112, the first film layer 118, the paper cellular core 116, the second skin 114 and the second film layer 120 so that, while the panel 110 is being formed in the mold, the first and second skins 112 and 114 and the film layers 118 and 120 have a forming temperature lying approximately in the range of 160° C. to 200° C., and, in this example, about 180° C.

The bottom layer 124 of the panel 110 may be made of a nonwoven scrim 124 of fine denier, spunbond thermoplastic (i.e., polypropylene and/or polyester or other thermoplastic compatible to the process) fibers in the form of a sheet and having a weight in a range of 8 to 100 gsm (i.e., grams per square meter). Preferably, the weight is in a range of 17 to 60 gms. Also, preferably, the denier is in a range of 1.8 to 2.2.

The scrim 124 has an open mesh of nonwoven synthetic thermoplastic fibers including a plurality of adjacent openings. The scrim 124 both transmits light to the underlying layer and reflects light while reducing the level of undesirable noise from a different area of the vehicle. The scrim 124 may be manufactured in a color which is substantially the same, complements or is in contrast with the color of the upper carpet 122. Also, the panel 110 including the underlying scrim layer 124 and the sheet 30 can be made in a single compression molding step.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A cargo management system including a vehicle load floor to compartmentalize a cargo area of the vehicle into an upper compartment and a covered lower compartment, the floor having a wood grain finish, the system comprising:
   a compression-molded composite panel including first and second outer layers of fiber-reinforced thermoplastic material, first and second sheets of thermoplastic adhesive and a core of cellulose-based material and positioned between the outer layers and having a large number of cavities, the outer layers being bonded to the core by the first and second sheets and by press molding, the first outer layer having a top surface;
   a multi-layer sheet bonded to the top surface of the first outer layer by the press molding and having a substantially planar upper support surface to support cargo in the upper compartment and to provide the load floor with the wood grain finish; and
   a cargo trim panel secured to a backrest of a seat of the vehicle, the trim panel having a wood grain finish.

2. The system as claimed in claim 1, wherein the load floor includes a cover part to cover the lower compartment, the cover part being movable between different use positions including open and closed positions relative to the rest of the load floor.

3. The system as claimed in claim 2, wherein the cover part is pivotally connected to the rest of the load floor.

4. The system as claimed in claim 1, wherein the multi-layer sheet includes a pattern layer which provides the simulated wood grain finish.

5. The system as claimed in claim 4, wherein the multi-layer sheet includes a substrate layer bonded to the lower surface of the pattern layer.

6. The system as claimed in claim 5, wherein the multi-layer sheet includes a backing layer bonded to a lower surface of the substrate layer, the backing layer being bonded to the top surface of the first outer layer by the press molding.

7. The system as claimed in claim 1, further comprising a plurality of parallel, spaced runners or rails which extend above a top surface of the multi-layer sheet to protect the top surface of the multi-layer sheet.

8. The system as claimed in claim 4, wherein the pattern layer is a vinyl layer formed to simulate wood.

9. The system as claimed in claim 4, wherein the pattern layer has wood design on an upper surface thereof.

10. A cargo management system including a vehicle load floor to compartmentalize a cargo area of the vehicle into an upper compartment and a covered lower compartment, the floor having a wood grain finish, the system comprising:
  a compression-molded composite panel including first and second outer layers of fiber-reinforced thermoplastic material, first and second sheets of thermoplastic adhesive and a core of cellulose-based material and positioned between the outer layers and having a large number of cavities, the outer layers being bonded to the core by the first and second sheets and by press molding, the first outer layer having a top surface;
  a multi-layer sheet bonded to the top surface of the first outer layer by the press molding and having a substantially planar upper support surface to support cargo in the upper compartment and to provide the load floor with the wood grain finish; and
  a pair of cargo trim panels supported above the vehicle load floor at opposite sides of the load floor within the interior of the vehicle, each panel having a wood grain finish.

* * * * *